No. 790,475. PATENTED MAY 23, 1905.
B. A. BEHREND.
DYNAMO ELECTRIC MACHINE.
APPLICATION FILED SEPT. 19, 1904.
2 SHEETS—SHEET 1.
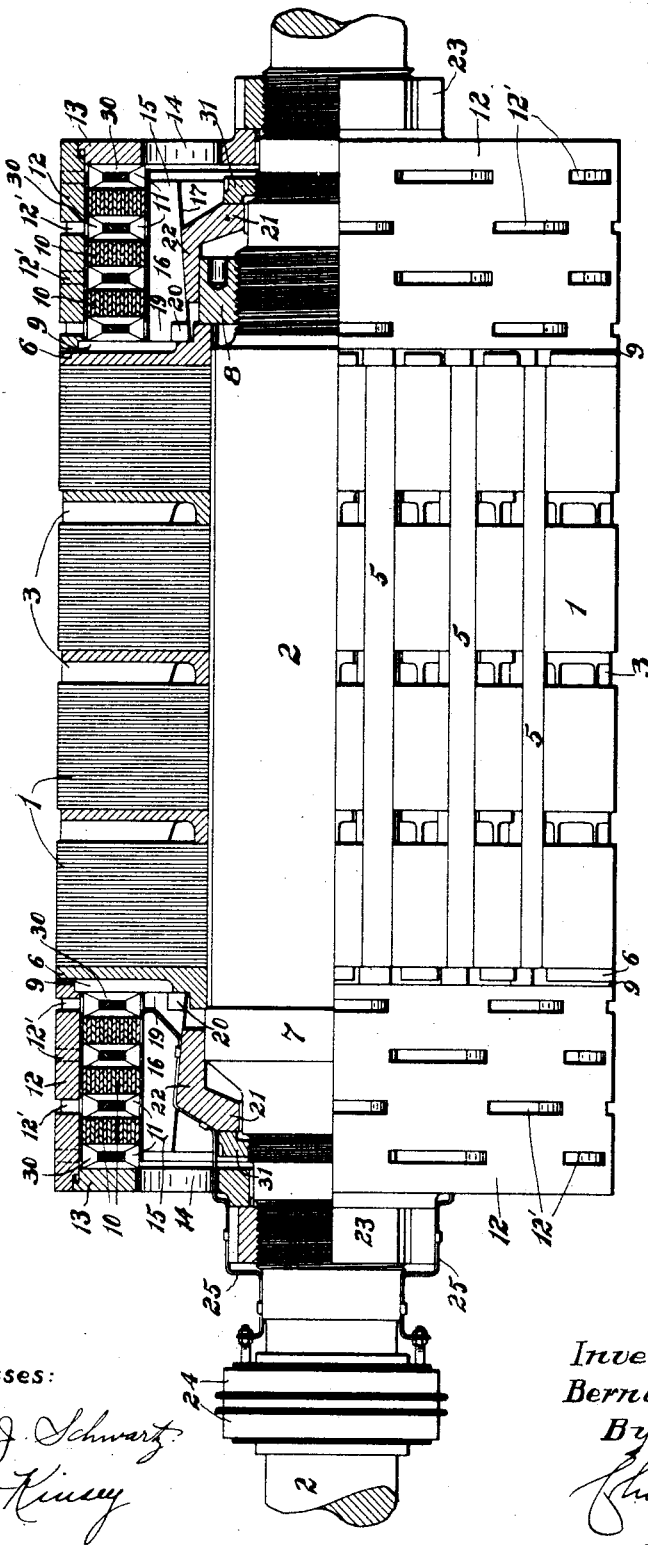
Witnesses:
George J. Schwartz
Fred J. Kinny
Inventor:
Bernard A. Behrend.
By
Chas. E. Lord
Attorney.

No. 790,475. PATENTED MAY 23, 1905.
B. A. BEHREND.
DYNAMO ELECTRIC MACHINE.
APPLICATION FILED SEPT. 19, 1904.
2 SHEETS—SHEET 2.
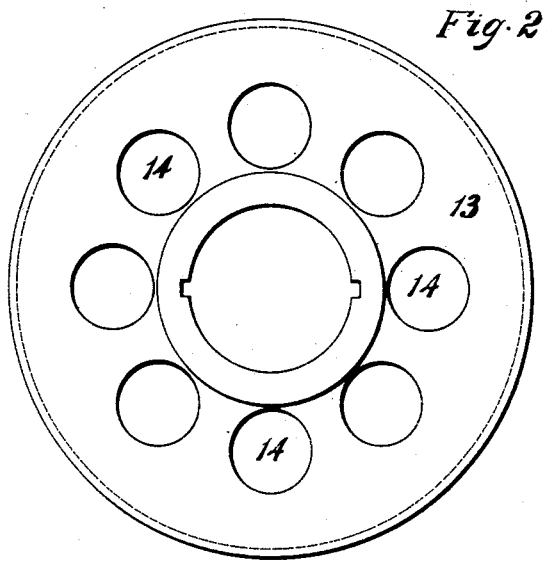
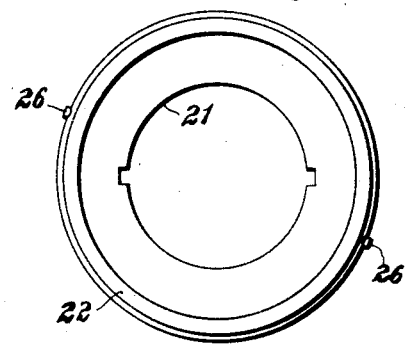
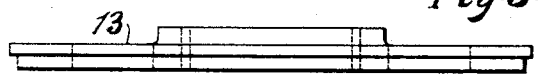
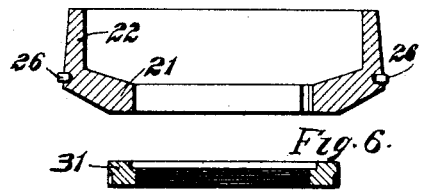
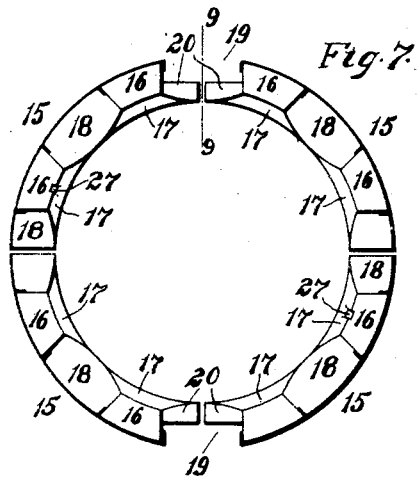
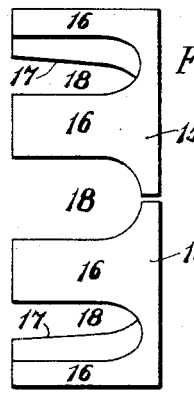
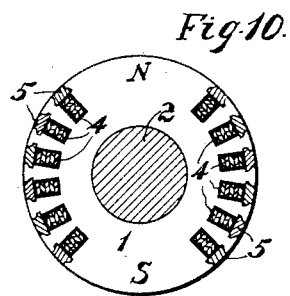
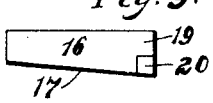
Witnesses:
George J. Schwartz
Fred J. Kinney
Inventor:
Bernard A. Behrend.
By
Chas. E. Lord
Attorney.

No. 790,475.

Patented May 23, 1905.

UNITED STATES PATENT OFFICE.

BERNARD ARTHUR BEHREND, OF NORWOOD, OHIO, ASSIGNOR TO THE BULLOCK ELECTRIC MANUFACTURING COMPANY, A CORPORATION OF OHIO.

DYNAMO-ELECTRIC MACHINE.

SPECIFICATION forming part of Letters Patent No. 790,475, dated May 23, 1905.

Application filed September 19, 1904. Serial No. 225,073.

*To all whom it may concern:*

Be it known that I, BERNARD ARTHUR BEHREND, a citizen of the United States, residing at Norwood, in the county of Hamilton and State of Ohio, have invented certain new and useful Improvements in Dynamo-Electric Machines, of which the following is a full, clear, and exact specification.

My present invention relates to dynamo-electric machines, and more particularly to the construction and arrangement of the rotatable member of rotating field-alternators.

The object of the invention is to provide an improved construction for the rotatable element or rotor of a dynamo-electric machine especially designed for high speed, such as the rotating field of an alternating-current generator directly connected to a steam-turbine, and to secure a rigid well-balanced structure with all the vital parts of the rotor well protected and held firmly in place without interfering with the proper ventilation of the rotor.

The invention comprises improvements on the construction of dynamo-electric machines illustrated and described in a prior application, Serial No. 702,922, filed by W. D. Pomeroy and myself, and specifically consists of improvements in the supports for the windings on the rotatable member, which will be hereinafter described, and more specifically pointed out in the appended claims.

In the accompanying drawings, which show the preferred embodiment of my invention, Figure 1 represents a part sectional and part side view of a revolving field-magnet. Figs. 2 and 3 are face and edge views of the end cover. Figs. 4 and 5 are end and sectional views, respectively, of the clamping-ring. Fig. 6 is a sectional view of the holding-nut for the clamping-ring. Fig. 7 is an end view of the rotor wedge-pieces. Fig. 8 is a side view of the same. Fig. 9 is a detail view of the wedge-piece on the line 9 9 of Fig. 7, and Fig. 10 is a cross-section, very much reduced, of the rotor-core.

The core is built up of laminæ 1, assembled on the supporting-shaft 2, and are grouped in sections spaced from each other by the separators 3 of any approved design. The outline of the laminæ is indicated in Fig. 10, the core being of the slotted type. In the present instance the rotor represents a rotating field-magnet, the windings 4 being connected in series, so as to produce when excited by direct current a north pole N and a south pole S diametrically opposite each other, giving a bipolar field. The windings are retained in the slots by the wedges 5, of phosphor-bronze or some other non-magnetic metal, and the outer surface is finished so as to give a smooth exterior.

The laminæ are clamped between the end plates 6, one of which abuts against the shoulder 7 on the shaft and the other is retained in place by the nut 8, screwed onto the shaft 2. The said end plates are of the same general outline as the laminæ shown in Fig. 10. At diametrically opposite points corresponding to the portions not slotted, which are indicated by N S in Fig. 10, the faces of the end plates are partially cut away, as shown at 9, Fig. 1, to provide openings for ventilation.

The end connections of the windings are shown at 10, Fig. 1, and the coils are separated from each other by spaces 11 to provide for ventilation. These end connections are maintained a predetermined distance apart when clamped against the core in a direction parallel to the longitudinal axis of the rotatable member by the end cover 13. The spacing-blocks 30 are employed for this purpose and do not materially interfere with the ventilating-spaces between the end connections. The spacing-blocks are placed between the end connections and the end plate 6 and end cover 13 and also between the end connections themselves. The end connections are covered by the cylindrical pieces 12 of the nickel-steel or some other metal having great mechanical strength. The cylindrical covers 12 are notched into the end plates 6 at one end and into end cover-plates 13 at the other, as shown in Fig. 1. The end cover-plate 13 (shown in detail in Figs. 2 and 3) is mounted and keyed upon the shaft 2. It is provided with a number of openings 14 for ventilation, and the cylindrical covers 12 are also provided with openings 12' for the same purpose.

The latter openings register with the spaces 11 between the coils and the openings 9 in the end plates 6.

At the interior surface of the end connections are located the adjustable wedge-pieces 15. (Shown in detail in Figs. 7, 8, and 9.) Four of these wedge-pieces comprise an expansible ring, one of which rings is used at each end of the rotor. The wedge-pieces are of some suitable cast metal, such as aluminium composition, and are provided with projections 16, having inclined inner surfaces 17, the said projections being separated from each other by openings 18. In the composite ring there are openings 19, provided at diametrically opposite points, these being created by cutting away the corners of the wedge-pieces, as shown in Figs. 7 and 9, leaving only the projecting ends 20.

Within the wedge-pieces 15 is placed a clamping-ring. (Shown in detail in Figs. 4 and 5.) This clamping-ring has a portion 21, which is fitted to the shaft and keyed thereon, and a portion 22 of larger diameter which in the ring at the left-hand end of the rotor engages an enlarged portion of the shaft and in that at the right-hand end engages the nut 8. The outer surface of the part 22 of the ring is inclined to correspond with the inclined surface 17 of the projections 16. The clamping-ring at each end of the rotor is moved into position and maintained in such position by the nut 31, mounted on shaft 2. This nut is entirely independent of the end cover. When the clamping-rings are forced into position, the wedge-pieces 15, which seat against the end plates, are pressed radially outward against the end connections and securely hold the latter in a fixed position between the said wedge-pieces and the cylindrical covers 12. Projections 26 on the clamping-ring engage slots 27 in the wedge-pieces and prevent the latter from turning. The end covers are held in place by the nuts 23, screwed onto the shaft, and act to clamp the end connections 10 against the core in a direction parallel to the longitudinal axis of the rotating magnet. This longitudinal clamping means is therefore entirely independent of the radial clamping means. Current may be conducted to the rotor-winding through the collector-rings 24 and the leads 25, one lead being placed diametrically opposite the other, so as to be balanced.

In the operation of the rotor there is a free circulation of air through the openings 14 in the end covers and between the projections 16 of the wedge-pieces and out through the spaces 11 between the coils and through the openings 12 in the cylindrical covers. The air may also pass through the openings 19 and 9 between the inner end turns and the end plates and between the outer end turns and end covers. The spacing-blocks 30 do not materially interfere with these ventilating passage-ways. Ventilation is further secured by air passing into and out of the spaces between the sections of laminæ.

Although I have shown and described my invention as embodied in a bipolar field-magnet construction, it is obvious that any number of poles desired may be used, or the rotor may be wound as an armature, and other changes may be made in construction without departing from the spirit of the invention or the scope of the claims.

Having thus described my invention, what I claim as new, and desire to secure by Letters Patent, is—

1. In the rotatable member of a dynamo-electric machine, the combination of a core, windings thereon having end turns or connections, and an end cover for forcing said end turns against the core in a direction parallel to the longitudinal axis of the rotatable member.

2. In the rotatable member of a dynamo-electric machine, the combination of a core, windings thereon having end turns or connections, an end cover for forcing said end turns against the core in a direction parallel to the longitudinal axis of the rotatable member, and spacing-blocks for the purpose of maintaining said end connections at a predetermined distance apart when under compression.

3. In the rotatable member of a dynamo-electric machine, the combination of a core, windings thereon having end turns or connections, and means for supporting said end turns or connections, comprising an end cover for forcing said end turns against the core in a direction parallel to the longitudinal axis of the rotatable member, an outside cylindrical cover, and means independent of said end cover for forcing said end connections radially against said cylindrical cover.

4. In the rotatable element of a dynamo-electric machine, the combination of a core, windings thereon having end turns or connections and means for supporting said end turns, comprising an end cover for forcing said end turns against the core in a direction parallel to the longitudinal axis of said rotatable member, an outside cylindrical cover, a plurality of adjustable wedges for forcing said end connections radially against said cylindrical cover, and means independent of said end cover for adjusting said wedges.

5. In the rotatable element of a dynamo-electric machine, the combination of a core, windings thereon having end turns or connections, and means for supporting said end turns, comprising an end cover, an outside cylindrical cover, and means independent of the end cover for forcing said end connections outwardly against the cylindrical cover.

6. In the rotatable element of a dynamo-electric machine, the combination of a core, windings thereon having end turns or connections and means for supporting said end turns, comprising an end cover, a cylindrical outside cover and means independent of said end cover for forcing said end connections outwardly against said cylindrical cover, said end cover and cylindrical cover being provided with openings communicating with the spaces between the end connections for the purpose of permitting the passage of air through the end connections to ventilate the same.

7. In the rotatable element of a dynamo-electric machine, the combination of a core, windings thereon having end turns or connections, and means for supporting the end turns, comprising a cylindrical cover, means for clamping said end connections in a direction parallel to the longitudinal axis of the rotatable member, and means for forcing said end connections outwardly against the cylindrical cover.

In testimony whereof I affix my signature in the presence of two witnesses.

BERNARD ARTHUR BEHREND.

Witnesses:
LILLIAN J. BRITTON,
FRED J. KINSEY.